INVENTOR.
E.F.N. Harper
BY
Robert K. Schumacher
ATTORNEY

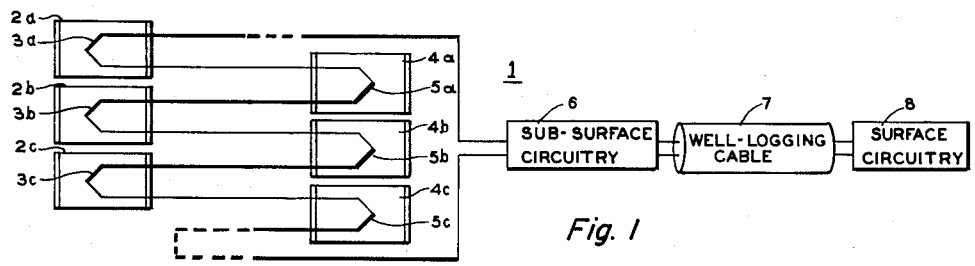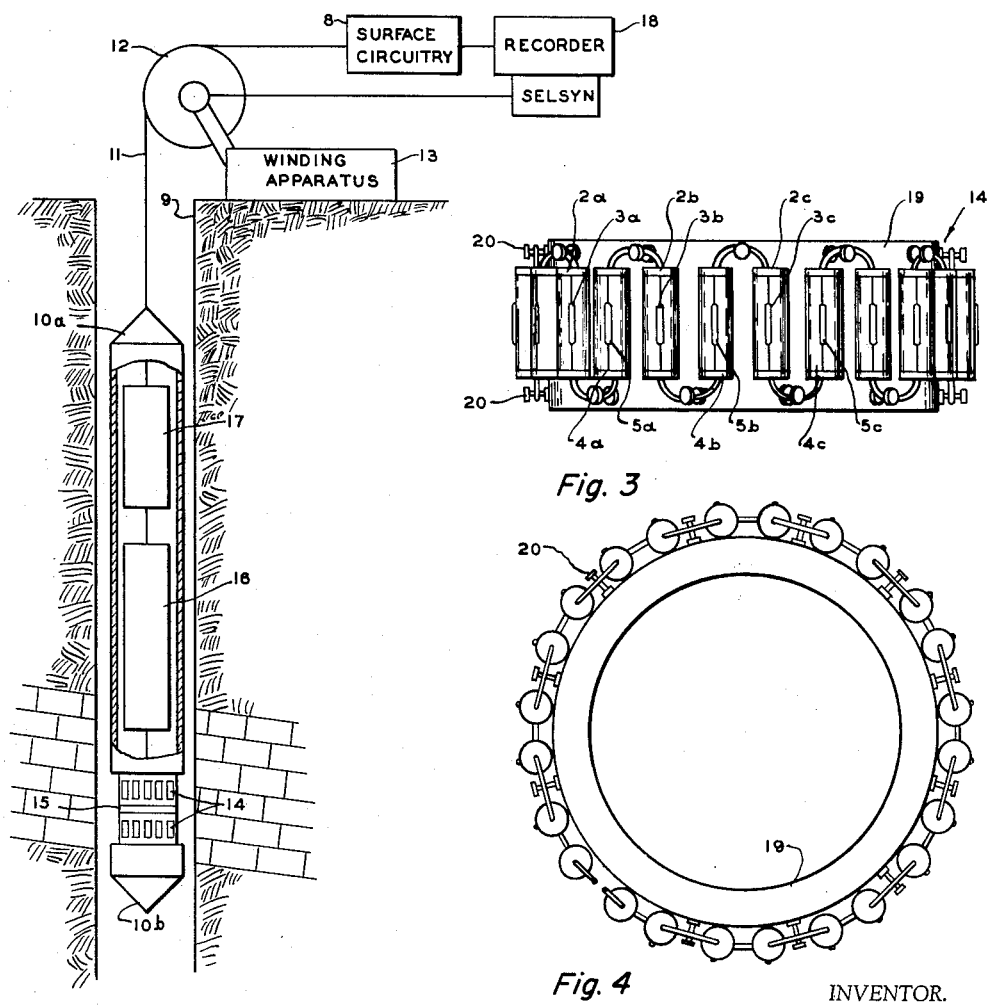

United States Patent Office 2,972,251
Patented Feb. 21, 1961

2,972,251

METHOD AND APPARATUS FOR INFRARED DETECTION OF SUBSURFACE HYDROCARBONS

Elton Floyd Neil Harper, Tulsa, Okla., assignor to Well Surveys, Incorporated, a corporation of Delaware Filed Mar. 29, 1957, Ser. No. 649,330

8 Claims. (Cl. 73—154)

This invention relates to geophysical exploration and more particularly to the selective identification in situ of earth deposits by their radiations in the infrared spectrum.

In conducting operations to discover surface or subsurface deposits of certain substances, the need for a simple and reliable detector has long been felt. For instance, in logging the character of the various strata encountered by a borehole, it would be highly advantageous to possess an efficient method for selectively identifying the oil bearing sands or shales penetrated by the well bore.

Accordingly, the present invention contemplates an ingenious method and apparatus for indicating the presence of hydrocarbon deposits in the earth's strata. While it will become obvious as the description proceeds that substances other than hydrocarbons may be detected with equal facility, the application of the invention to the detection of subsurface oil deposits has been chosen to illustrate its utility, reliability, and simplicity.

The method of this invention is based upon the principle that materials radiate energy in one or more relatively narrow frequency bands in dependence upon their temperature. For example, the application of heat energy to the organic molecules of hydrogen-carbon compounds like coal or oil results in the emanation of relatively high radiant energy of a given characteristic frequency. This phenomenon, i.e., the emission spectrum, is not only characteristic of the molecular structure of organic compounds such as hydrocarbons and proteins, but is also associated with the molecular structure of all inorganic compounds. The changes which occur in the elastic molecular bonds as a result of increased thermal agitation, have been suggested as a factor in the emanation of these characteristic frequencies. However, other internal molecular activity undoubtedly contributes to the phenomena, and for this reason it is desired not to limit the invention to any particular theory as to the specific cause thereof. Because of the nature of heat radiation, it will be appreciated that these frequency bands occur in the infrared region of the electromagnetic spectrum.

The radiant energy which is emitted by a substance is best detected and individualized by a material which resonates at exactly the same frequencies. As will be explained more fully below, the present method and apparatus uses for a detector a quantity of the particular compound whose presence is to be ascertained. This quantity has been designated as the resonant sample for purposes of this specification.

The radiant energy transmitted from the substance to the resonant sample is selectively absorbed and effects a corresponding rise in the temperature thereof. Where the radiant energy impinges upon a material other than that of the resonant sample, such a material being at least partly non-resonant and absorbs correspondingly less energy and experiences a lesser temperature rise. Hence, where both resonant and at least partly non-resonant samples are placed in proximity and exposed to the same heat radiation, the greater response of the resonant sample to the radiation provides a means for detecting the presence of a substance. The advantages of the method in detecting the presence of organic compounds such as the hydrocarbons, where the absorption bands are located in the infrared portion of the electromagnetic spectrum, are believed obvious. In the present invention, the method is applied to the detection of subsurface petroleum deposits by utilizing a sample which resonates with the thermal radiation emanating from such deposits. However, it will be appreciated that the invention is by no means limited to the detection of hydrocarbons, and may be used to detect many other types of organic and inorganic compounds. From the aforementioned it will become apparent that theoretically the best detecting means would be a material which acts like a black body in those frequency ranges where the absorption and hence the emission of the substance to be detected has high or even peak values. Because the emission of a material has high values at frequencies where the absorption is high, there may be chosen a material which is identical with the substance to be detected, but it will be appreciated that a composition of other material may be elected, the emission and absorption of which has even higher values at the particular frequencies than those of the substance to be detected. Furthermore, the invention may be performed with two samples, having any kind of different absorption sensitivity with respect to the substance to be detected. At any time the two samples are subjected to the same radiation from the substance to be detected, their temperatures change at different rates towards equilibrium. Hence, there will be a detectable temperature difference between the two samples. An electrical signal proportional to this difference may be produced by a thermocouple circuit. This signal may be recorded as such or it may be operated upon to derive a signal for recording which is more characteristic of formation variably.

In the present application of the invention to petroleum exploration, the method utilizes an apparatus which is designed as a subsurface instrument for detecting oil bearing sands or shales in proximity to a well bore. Of course, the utility of the method in connection with surface exploration conducted with a suitable surface type instrument is obvious and falls equally well within the expected purview of the present invention.

In an easy way of practicing the present method of detecting oil by infrared spectroscopy, and more particularly by detection of the self-excited radiation of the hydrocarbons, the subsurface detector is provided with a sample of the material to be detected. Since, as earlier stated, the best detector is a device which resonates at the identical frequencies radiated by the material to be detected, a quantity of oil is utilized as the resonant sample, and functions as a resonant thermal absorber.

There is also provided a quantity of non-resonant material within the subsurface instrument. Both the resonant and the non-resonant samples are positioned to intercept the thermal radiation emitted by subsurface oil deposits. Detection of the oil deposits is made possible by the increase in the temperature of the resonant sample effected by selective reception of the infrared radiation. The non-resonant sample, although subjected to the same thermal radiation is unable to resonate with the particular band of frequencies in question. Thus, the non-resonant sample remains relatively cooler than the resonant sample and the temperature differential between the samples may be used to indicate the presence of a hydrocarbon deposit.

By means of suitable measuring apparatus, such as the circuits disclosed later in this specification, the rise in the temperature of the resonant sample caused by the selective absorption of radiant energy provides a reliable and easily recognizable signal of the presence of subsurface oil deposits.

Accordingly, therefore, a primary object of this invention is to provide a method for selectively detecting substances by their radiation in the infrared spectrum.

Another object of this invention is to teach a method of selectively detecting subsurface oil deposits by receiving radiant energy in the characteristic absorption bands for organic hydrocarbon compounds.

Another object of the present invention is to provide apparatus for selectively detecting the presence of subsurface oil deposits in the strata penetrated by a well bore.

Still another object of this invention is to provide the structure and circuitry for a novel subsurface instrument which utilizes thermopile units to detect the presence of oil.

A further object of this invention is to teach an ingenious method and apparatus for qualitatively indicating the presence of molecular substances by detecting the characteristic thermal radiations emanating therefrom.

A still further object of this invention is to disclose a simple and reliable process for identifying substances by observing the temperature rise attributable to resonance with the heat radiation emanating therefrom.

Other and further objects of the present invention will become apparent through reference to the following detailed description and drawings in which like numerals indicate like parts and in which:

Figure 1 illustrates schematically a block diagram of the invention, and shows a few of the resonant and non-resonant samples with their associated thermocouple junctions.

Figure 2 illustrates schematically a block diagram of a well logging system utilizing a subsurface instrument to detect oil deposits.

Figure 3 is a front view of one of the thermopile units used in the invention, and shows the method of mounting the thermocouple elements in the resonant and non-resonant samples.

Figure 4 is a top plan view of the thermopile unit illustrated in Figure 3.

Figure 6:
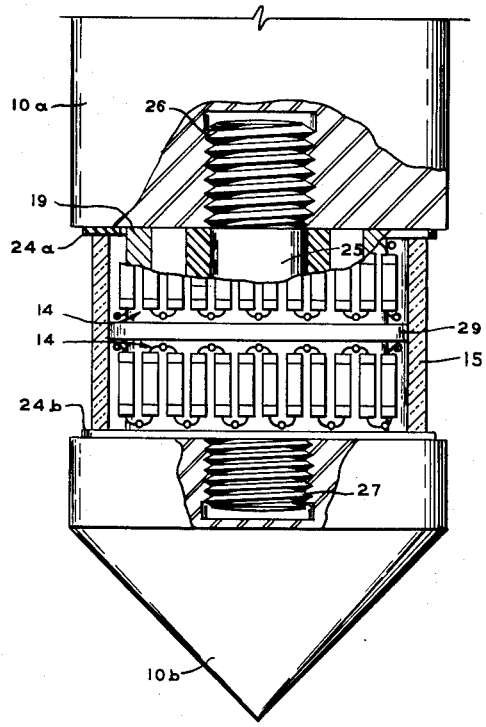
Figure 6 shows an enlarged fragmentary view of the structure of the subsurface detector.

Turning now to the drawings and more particularly to Figure 1, the numeral 1 indicates generally a block diagram of some of the circuitry and components utilized in detecting subsurface petroleum deposits according to the method of this invention. There is provided a plurality of sealed tubes 2a, 2b, and 2c each of which is filled with a quantity of the sample to be detected. For purposes of this specification, the material contained within tubes 2a, 2b and 2c is referred to as the resonant sample. In this case, the resonant sample comprises a quantity of such as crude oil, and is constituted chiefly of a mixture of hydrocarbons.

Within each of the tubes 2a, 2b, and 2c there is immersed the so-called hot junction of a thermocouple, and these are denoted by reference numerals 3a, 3b, and 3c, respectively.

In the system of Figure 1 there is also provided a plurality of sealed tubes 4a, 4b, and 4c. Each of these tubes is filled with a substance, or mixture of substances other than that which is provided in the tubes 2a, 2b, and 2c. More particularly, tubes 4a, 4b, and 4c comprise non-resonant samples which are exposed to the heat radiation from the material to be detected, but which fail to absorb the maximum energy therefrom. The non-resonant sample contained in each of the tubes 4a, 4b, and 4c may possess the same value of specific heat as characterizes the resonant sample in order that both resonant and non-resonant samples may heat at the same rate in the absence of radiation. Or, in order to assure a "null" in the thermocouple circuit during exposure of the subsurface instrument to ambient borehole temperatures, the non-resonant sample may be proportioned in such a manner as to cause it to maintain the same temperature as the resonant sample when receiving the same amount of heat by conduction. Where a non-resonant sample with the same value of specific heat as the resonant sample is not obtainable, the latter mentioned expedient will serve fairly well in practicing the invention.

It will be appreciated in connection with Figure 1 that only a few of the resonant and non-resonant samples with their associated thermocouple junctions have been illustrated in order to expedite the disclosure of the method. In actual practice, as typified by the construction shown in Figure 3, a large number of both types of samples are used, in order to develop the largest possible thermoelectric signal.

During exposure to borehole temperatures, and in the absence of radiation from the material to be detected, the amount of heat required to raise the temperature of either the resonant or the non-resonant sample to any given value should be substantially equal. Thus, by placing the hot junction of a thermocouple in the resonant sample, and the cold junction in the non-resonant sample, there is provided a self-balancing circuit which compensates for changes in the ambient borehole temperature. With overall variations in the temperature in proximity to both samples, the hot and cold junctions each attain the same equilibrium temperature, and no thermal current can flow in the thermocouple circuit.

However, if radiant energy in the absorption bands of particular hydrocarbon compounds is encountered, the selective absorption of energy by the resonant samples causes them to heat rapidly. This causes the hot junctions 3a, 3b, and 3c which are immersed in the resonant sample to reach a temperature higher than that of the so-called cold junctions 5a, 5b, and 5c. Accordingly, the thermoelectric current thus generated provides an indication of the presence of organic hydrocarbon molecules in the subsurface strata. In the instant embodiment, use is made of a plurality of additively connected thermocouple units. The thermal voltages thus provided are combined to form a thermopile having the proper sensitivity to accurately meter the temperature differentials of interest.

In practicing the invention, the materials iron and constantan are used to form the thermocouples. The method of forming and supporting the thermocouples is shown most clearly in Figure 6 and will be explained later in connection therewith.

Continuing now with the description of Figure 1, the irradiation of both resonant and non-resonant samples with the frequencies occurring in the characteristic absorption bands gives rise to a thermoelectric signal which is applied to the subsurface circuitry indicated by the numeral 6. The subsurface circuitry develops an output signal of the required characteristics and may include suitable stages of amplification.

From the subsurface circuitry 6 the signal is applied, via well logging cable 7, to the surface circuitry 8. Since a number of conventional circuits exist for shaping, amplifying and otherwise modifying the thermoelectric signal measured by the thermocouples, the terms "subsurface circuitry" and "surface circuitry" are used herein to generically comprehend the several types of suitable circuits, and it is desired not to limit the invention to any specific form thereof.

Turning now to Figure 2, there is shown schematically a block diagram of a well logging system using a subsurface detector. The detector comprises a housing 10a and a nose 10b with a cylindrical glass member 15 secured therebetween. The assembly is suspended within well bore 9 on the lower end of cable 11. Cable 11, being of conventional construction, is characterized by ample mechanical strength and is provided with suitable conductor means for conveying electrical signals to the surface equipment. The cable 11 passes over a drum 12 which is provided with suitable winding apparatus 13 for raising and lowering the assembly as desired.

Below housing 10a, there is connected a plurality of thermopile units 14, surrounded by the glass cylinder 15 which is substantially transparent to infrared radiation. The glass cylinder 15 is securely mounted between the tool housing 10a and the nose 10b and serves to protect the thermopile units.

Thermoelectric signals generated by the thermopile units 14 are applied to a chopper 16. The unit 16 functions as a low level instrument chopper to convert the thermocouple current into an alternating current signal for amplification and recording. From chopper 16 the alternating voltage signal is applied to amplifier 17, from whence the amplified signal is applied to the cable 11 for transmission up-hole.

At the surface, the signal is coupled into the input of the surface circuitry 8, which may comprise one or more stages of amplifying circuits or the like, for suitably shaping or modifying the received signal.

After suitable shaping or modification in the unit 8, the signal may be applied to recorder 18. The unit 18 may comprise a conventional pen-chart recorder in which a pen continuously traces an inked line on a record strip which moves in correlation to the relative depth of the subsurface detector. Alternatively, the signal from the surface circuitry 8 may actuate a galvanometer movement which controls the position of a light beam which is focused on a moving, light-sensitive photographic strip. In general, any of the several suitable types of recorders may be used, and it is desired not to limit the invention to any particular form of recorder.

Turning now to Figure 3, the numeral 14 indicates generally a front view of one of the thermopile units used in practicing the invention. As shown in this figure, as well as in Figure 4, the thermopile unit includes an annular base member 19 upon which there is mounted a plurality of sealed glass tubes 2a, 2b, 2c and 4a, 4b, and 4c. It will be observed that the tubes 2a and 4a, like tubes 2b and 4b, and tubes 2c and 4c are mounted close together. In this way each pair of glass tubes is exposed to radiant energy of substantially the same intensity.

In Figure 3, the tubes 2a, 2b and 2c correspond exactly to those shown schematically in Figure 1. Moreover, as explained in conjunction with that drawing, each of these tubes is filled with a sample of the material which is to be detected, and which resonates when exposed to thermal radiation from such a source. Within each of the tubes 2a, 2b and 2c there is located the hot junction of a thermocouple as denoted by the reference numerals 3a, 3b and 3c, respectively. Within each of the tubes 4a, 4b and 4c the cold junctions 5a, 5b and 5c, respectively, are correspondingly located.

As explained in conjunction with Figure 1, each of the tubes 2a, 2b and 2c is filled with a sample of oil which comprises a mixture of hydrocarbons. Each of the tubes 4a, 4b and 4c is filled with a substance having different infrared absorption characteristics but the same specific heat as the oil used for the resonant samples. In the present embodiment olive oil has been found satisfactory for this purpose. In general, however, it is possible to use any substance or mixture of substances which rises in temperature at the same rate as the resonant sample, when neither sample is exposed to thermal radiation from the particular material to be detected.

In order to secure the glass tubes which contain the resonant and non-resonant samples, the annular base member 19 is provided with a plurality of radially extending separated supports all of them indicated by the numeral 20. As clearly seen in Figure 3, the upper tier of supports 20 is axially displaced from the lower tier in order to expedite the connection of the leads from the hot and cold thermocouple junctions thereto.

Figure 5:
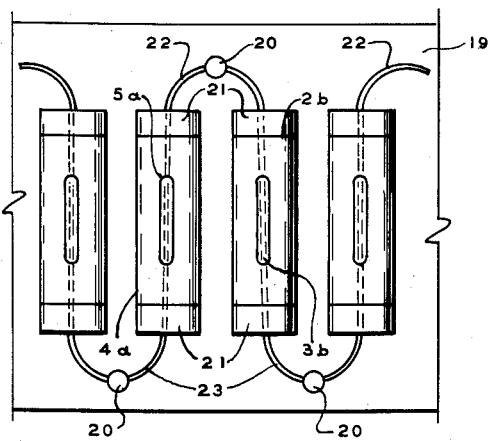
Figure 5 is an enlarged fragmentary view of a portion of a thermopile unit and illustrates the mode of construction and mounting of the individual resonant and non-resonant samples thereupon.

Turning now to Figure 5, which represents an enlarged fragmentary view of a portion of the thermopile unit 14, the numerals 4a and 2b again each indicate a glass tube filled, respectively, with samples of the nonresonant and resonant materials.

The tubes 4a and 2b are each provided with suitable seals 21 at opposite ends thereof to prevent the escape of the fluids contained therein. Each of the seals 21 is provided with a hole through which passes one lead of a thermocouple junction. Thus, in Figure 5, the numeral 22 denotes a pair of constantan leads which penetrate the upper seals 21 of tubes 4a and 2b, respectively. Conversely, the numeral 23 denotes a pair of iron leads which penetrate the lower seals 21 of the tubes 4a and 2b, respectively. In order to secure the tubes to the annular member 19, the iron leads 23 and the constantan leads 22 are in each case tightly looped around the adjacent respective support 20, as shown most clearly in Figures 3 and 5. This mode of connection assists in equalizing the temperature between the hot and cold junctions when no resonance causing radiation is present.

Within tubes 2b and 4a there is thus formed hot and cold thermocouple junctions 3b and 5a, respectively. These junctions are fabricated by twisting the bare iron wire with the constantan wire and soldering the full length of the connection. It will be appreciated that other dissimilar metals may be used to form the hot and cold thermocouple junctions, and that the metals iron and constantan, as specified therein, are merely illustrative.

As earlier explained, the hot and cold junctions with their different absorptive materials are mounted alternately on the annular base member, and are series-connected so that the individual thermocouple voltages are additive. As utilized herein, series-connected thermocouples are seen to comprise a superior method of metering the temperature differentials encountered.

Continuing now with the detailed description, and more particularly of the embodiment thereof illustrated in Figure 6, there is shown an enlarged fragmentary view of the subsurface detector of this invention.

The subsurface detector comprises housing 10a and nose 10b with a hollow cylindrical glass member 15 secured therebetween. The glass member 15 is substantially transparent to infrared radiation.

Between the upper surface of the glass member 15 and the housing 10a, there is provided a sealing gasket 24a. An identical sealing gasket 24b is located between the lower surface of the glass member 15 and the nose 10b.

The relative position of the housing 10a, nose 10b and glass member 15 is maintained by means of a rod 25. The rod 25 is provided with threaded portions 26 and 27 on its upper and lower ends, respectively. The portions 26 and 27 engage with internally threaded holes provided in the housing 10a and nose 10b and permit the glass member 15 to compress the upper and lower gaskets 24a and 24b, respectively.

Within the transparent glass member 15 there is located a pair of identical thermopile units 14. The thermopile units 14 are mounted in a ring substantially concentric with the rod 25 and spaced therefrom by means of the bushing 19, which may be composed of insulating fibre, plastic or other suitable material. As earlier explained in this specification, the hot and cold junctions which are immersed in the alternately spaced sample containing tubes are connected in series to provide a larger thermoelectric current. In Figure 6, the outputs of the two complete thermopile units are connected in series (not shown) for the same purpose. It will be appreciated that by merely extending the proper axial dimensions of the subsurface tool shown in Figure 6, many more thermopile units can be located therein. For this reason, the invention is not limited to the use of two thermopile units as shown in Figure 6, but comprehends the use of as many of such units as are required to achieve the desired sensitivity.

The thermopile units are separated axially by spacer 29 which comprises a flat annular disc-like member composed of any suitable material. The spacer 29 is proportioned to fit snugly within the bore of the glass member 15, and strengthen it against external pressure.

Since the interrelationship between the nose 10b, the housing 10a, and the plural thermopile units maintained in position within glass cylinder 15 by means of the rod 25 and associated spacers will now be understood to one skilled in the art, exhaustive additional description is deemed unnecessary.

In conclusion, it will now be apparent that I have disclosed a reliable and ingenious method and apparatus for detecting materials by infrared spectroscopy. While the application of my novel method and apparatus to detecting subsurface oil deposits has formed the subject of this specification for illustrative purposes, it will be appreciated that the invention is by no means thus limited, and is applicable to the detection of many other organic and inorganic substances.

Accordingly, therefore, while I have clearly and concisely disclosed my invention in compliance with the requirements of the statute, it will be apparent that many alterations, substitutions and modifications can be made therein without departing from the spirit and scope of the appended claims.

I claim:

1. In a system for selectively identifying hydrocarbon deposits in subsurface formations traversed by a borehole by their characteristic infrared radiations, a first group of samples capable of resonating with said infrared radiations, a second group of samples less capable of resonating with said infrarad radiations than said first group of samples, means for detecting the temperature differential between said first and second groups of samples and providing an electrical signal in response thereto, means for supporting and enclosing said first and second group of samples and said temperature differential detecting means, means for displacing said supporting and enclosing means along the length of the borehole, means for modifying said electrical signal, and means for recording said modified electrical signal.

2. In an apparatus for detecting the hydrocarbon deposits encountered by a borehole which penetrates the earth's strata, resonant samples adapted to intercept thermal radiations from said deposits and change in temperature at a first rate, less resonant samples disposed in proximity to said resonant samples to intercept said radiation and change in temperature at a second rate, thermocouple means comprising a hot junction within each of said resonant samples and a cold junction within each of said less resonant samples, subsurface circuitry connected to derive an electrical signal from said thermocouple means, means to house said resonant and less resonant samples as well as said thermocouple means and subsurface circuitry, means for imparting rectilinear motion to said housing means, surface circuitry adapted to receive an output signal from said subsurface circuitry, and means for coupling said output signal to the input of said surface circuitry.

3. In an apparatus for selectively identifying subsurface deposits in the earth by their radiations in the infrared spectrum, a subsurface assembly, means for causing said subsurface assembly to traverse a borehole penetrating said deposits, a first group of containers disposed within said assembly, a first sample material of the particular substance sought to be identified in said deposits contained in each of said first group of containers, a second group of containers disposed within said assembly, a second sample material contained in each of said second group of containers and having substantially the same specific heat as said first sample material but an infrared absorption rate which is different therefrom, a thermocouple circuit provided with an individual hot junction positioned within each container of said first group and an individual cold junction positioned within each container of said second group, said hot and cold junctions connected in series to produce a thermoelectric current when radiations from said deposits impinge upon said samples, subsurface circuitry disposed within said assembly and connected to receive said thermoelectric signal and modify same, suface circuitry connected to receive said modified thermoelectrical signal, and means electrically coupling said subsurface circuitry to said surface circuitry.

4. In a system for detecting the presence of subterranean deposits pierced by a borehole, first means adapted to absorb approximately maximum energy by resonating with thermal radiations emitted by said deposits, second means adapted to absorb considerably less than maximum energy from said radiations emitted by said deposits, means connected to detect the difference in energy absorption between said first and second means by sensing the temperature differential therebetween and providing an electrical signal proportional thereto, means for housing said first and second means and said detecting means, means for traversing said borehole with said housing means, and means for receiving and recording said electrical signal in correlation with the depth of said housing means in said borehole.

5. In an apparatus for selectively identifying subterranean deposits by their radiations in the infrared portion of the electromagnetic spectrum, a subsurface assembly which includes a housing, a nose, and cylindrical glass member secured therebetween; a plurality of resonant samples mounted within said assembly; a plurality of non-resonant samples mounted within said assembly; a thermocouple circuit disposed within said assembly and comprising a plurality of series connected hot and cold junctions, said hot junctions positioned respectively within said resonant samples and said cold junctions positioned respectively within said non-resonant samples; means including a chopper disposed within said assembly and connected to receive and convert the unidirectional output current of said thermocouple circuit into alternating current; means for amplifying said alternating current; surface means for receiving and modifying said alternating current; and recorder means for producing a record of said alternating current after modification by said surface means.

6. In a system for detecting the presence of subsurface deposits by their radiations in the infrared portion of the electromagnetic spectrum, a housing; a nose; means transparent to said radiation; means securing said housing, said nose and said transparent means in spaced relation; a plurality of thermopile units, each comprising an annular base member with a group of axially spaced resonant samples and a group of axially spaced non-resonant samples mounted alternately thereupon, each of said resonant samples housing a hot junction and each non-resonant samples housing a cold junction; means connecting said hot junctions, said cold junctions and said plurality of thermopiles in series; and means maintaining said thermopile units in spaced relation within said transparent means and between said housing and nose.

7. The method of discovering subsurface deposits penetrated by a well bore which comprises moving a first sample of substance it is desired to discover along said bore to intercept thermal radiations emitted by said deposits, simultaneously moving a second sample with different infrared absorptivity but substantially the same specific heat as said first sample along said bore, deriving an electrical signal systematically related to the temperature differential which occurs between said first and last mentioned samples by virtue of the selective absorption of energy by said first mentioned sample, transmitting said electrical signal to the surface, and recording said signal in correlation to the depth at which exposure of said samples to said radiation occurs.

8. In a system for ascertaining the presence of particular material, a first thermal absorber that resonantly absorbs thermal radiations emanating from said material, a second thermal absorber of absorbing property different from that of said first thermal absorber, and means connected to detect the temperature differential between said first and second thermal absorbers and provide a signal systematically related thereto.

References Cited in the file of this patent

UNITED STATES PATENTS

| | | |
|---|---|---|
| 2,186,948 | Adler | Jan. 16, 1940 |
| 2,392,873 | Zahl | Jan. 15, 1946 |
| 2,414,862 | Fearon | Jan. 28, 1947 |
| 2,482,773 | Hieronymus | Sept. 27, 1949 |
| 2,562,538 | Dyer | July 31, 1951 |
| 2,635,468 | Field | Apr. 21, 1953 |
| 2,896,442 | Bailey | July 28, 1959 |

FOREIGN PATENTS

| | | |
|---|---|---|
| 539,420 | France | Apr. 1, 1922 |
| 744,914 | Great Britain | Feb. 15, 1956 |